No. 885,909. PATENTED APR. 28, 1908.
T. CASEY.
NUT LOCK.
APPLICATION FILED AUG. 13, 1906.

WITNESSES:
E. K. Stewart

Tom Casey, INVENTOR.
By C. A. Snow & Co.
ATTORNEYS

THE NORRIS PETERS CO., WASHINGTON, D. C.

UNITED STATES PATENT OFFICE.

TOM CASEY, OF FRANKFORT, KENTUCKY, ASSIGNOR OF ONE-HALF TO JAMES A. TAYLOR, OF WACO, KENTUCKY.

NUT-LOCK.

No. 885,909.  Specification of Letters Patent.  Patented April 28, 1908.

Application filed August 13, 1906. Serial No. 330,397.

*To all whom it may concern:*

Be it known that I, TOM CASEY, a citizen of the United States, residing at Frankfort, in the county of Franklin and State of Kentucky, have invented a new and useful Nut-Lock, of which the following is a specification.

This invention has relation to nut locks and it consists in the novel construction and arrangement of its parts as hereinafter shown and described.

The object of the invention is to provide a positive nut lock adapted to be used in conjunction with nuts and bolts that pass through wooden or metallic supporting members. The locking member consists primarily of a washer having a bolt opening and a lug projecting inward from the wall thereof that enters a longitudinally extending groove provided in the thread of the bolt. The nut bears against the face of the washer and forces it against the metal or wood base. The washer is provided with radially extending wings, and with peripheral incisions in alinement with one edge of each of the wings forming prongs which are adapted to be bent at right angles to the face of the washer and forced into the wood of the support and adjacent to the prongs, the wings are provided with weakened lines or scorings to permit the wings readily to be bent up so as to cause them to engage the sides of the nut. When used upon a metal base, the wings are bent up substantially at the base of the nut and the ends of the wings are turned over the top of the nut in order to secure the said washer in permanent fixed relation upon the nut.

Figure 1:
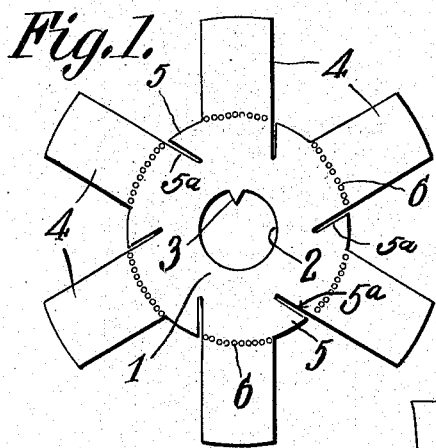
Figure 3:
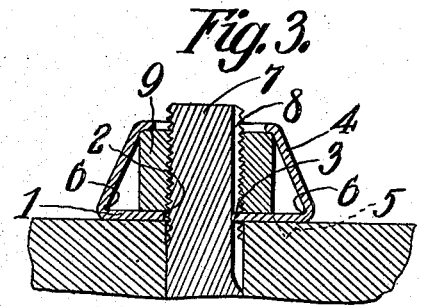
Figure 2:
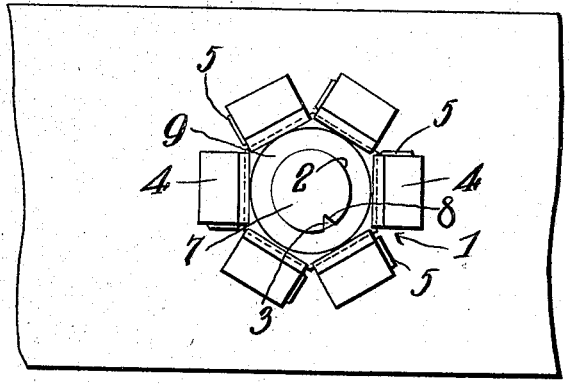
Figure 4:
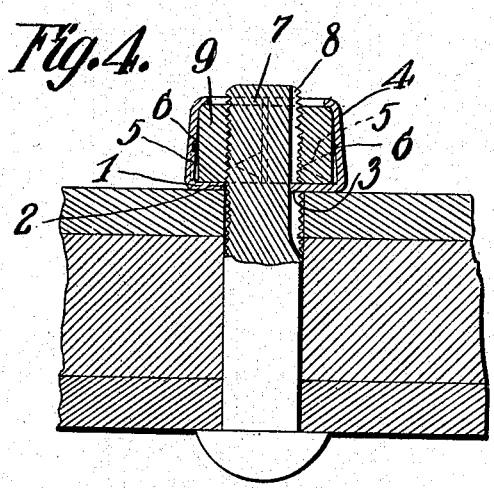

In the drawing: Figure 1 is a plan view of a washer forming a portion of the nut lock. Fig. 2 is a top plan view of the washer applied to a bolt and nut. Fig. 3 is a sectional view of the same. Fig. 4 is a sectional view of the washer showing a different method of application.

The nut lock consists of the washer 1 which is provided with the central bolt opening 2, having an inwardly extending lug or teat 3. The said washer is provided with the radially extending wings and adjacent to the base of each wing is a laterally extending triangular prong 5 formed by an incision $5^a$ disposed tangentially to the walls of the bolt opening. Just beyond the prongs 5 each wing 4 is provided with the weakened lines or scorings 6 which extend substantially transversely across the upper faces of the said flanges. The bolt 7 is provided along its thread with the V-shaped longitudinally extending groove 8.

In applying the nut lock to a nut on a bolt supported upon a wooden base, the bolt is passed through the opening 2 and the lug 3 seated in the groove 8. The washer 1 is forced down against the wooden base and the prongs 5 are driven into the wood. Thus the washer is firmly seated upon the wood and the bolt is held against rotation with relation to the wood. The wings 4 are then bent at the scorings to cause them to bear against the sides of the nut 9. Thus the said nut is positively held from rotation with relation to the bolt 7. In fact, all of the parts are locked in a positive manner with relation to each other. When the said washer is used upon a metal base, it is slipped over the bolt in the manner as above described and the nut 9 is then screwed against the washer. The wings 4 are bent to lie against the sides of the nut 9, the bends occurring not at the scorings 6 as previously described, but at the inner ends of the said wings. The outer ends of the wings 4 will project beyond the outer surface of the nut and are there bent over upon the nut so that the latter is restrained not only from turning with relation to the bolt, but it is positively retained in a direction longitudinal of the bolt with relation to the said washer 1. When the wings 4 are thus positioned along the sides and over the outer face of the nut 9, the prongs 5 are bent down against the adjacent sides of the nut or overlap the edges of the adjacent wings.

Having described my invention, what I claim as new and desire to secure by Letters Patent is:—

A nut lock comprising a washer provided with a bolt opening having an inwardly projecting lug, and with a plurality of radial wings weakened at the periphery of the washer by scorings arranged concentric with the bolt opening, the washer being incised along and in alinement with one edge of each of the wings forming thereby on each of the adjacent wings an approximately triangular prong.

In testimony that I claim the foregoing as my own, I have hereto affixed my signature in the presence of two witnesses.

TOM CASEY.

Witnesses:
W. B. SMITH,
S. T. PENCE.